Figure 1A:
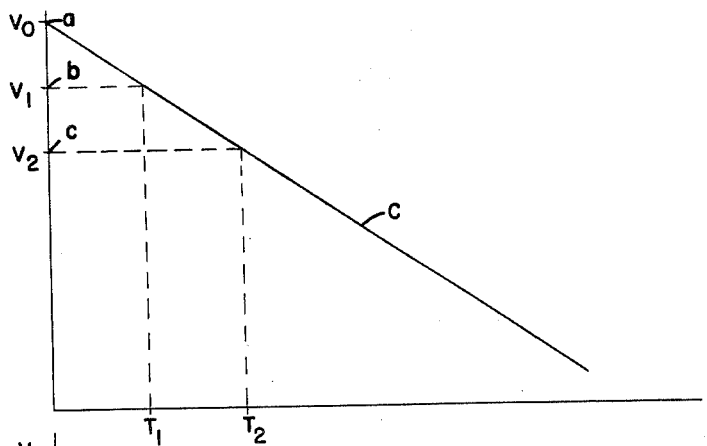

Nov. 3, 1964       E. SHAIN       3,155,821
COMPUTER METHOD AND APPARATUS
Filed Jan. 2, 1959                2 Sheets-Sheet 1

INVENTOR:
EDWIN SHAIN,
BY Michael Masnik
HIS ATTORNEY.

Nov. 3, 1964  E. SHAIN  3,155,821
COMPUTER METHOD AND APPARATUS
Filed Jan. 2, 1959  2 Sheets-Sheet 2

INVENTOR:
EDWIN SHAIN,
BY Michael Masnik
HIS ATTORNEY.

United States Patent Office 3,155,821
Patented Nov. 3, 1964

3,155,821
COMPUTER METHOD AND APPARATUS
Edwin Shain, De Witt, N.Y., assignor to General Electric
Company, a corporation of New York
Filed Jan. 2, 1959, Ser. No. 784,815
4 Claims. (Cl. 235—168)

This invention relates to a method and apparatus for performing certain measurements and computations and particularly to a method and arrangement for determining the value of a function by a method of extrapolation when two points of the function are known.

Oftentimes there is a need in the electrical and electronic arts to measure or determine the value of a function, such as velocity, at a given value of independent variable, such as time. Oftentimes it is not possible to make measurements at the desired time, but it is possible to make measurements at other time periods. A need therefore arises for providing an automatic method and arrangement for extrapolating the measured information in order to determine the values of velocity at other time intervals. Systems are in existence which permit measurement of velocity at any time interval. However, under certain circumstances this may not be possible. Prior arrangements for extrapolating for the desired information have been found to be cumbersome, complicated, erratic, and time consuming.

Accordingly, it is an object of this invention to provide an improved extrapolation method and arrangement.

A further object of this invention is to provide a method and arrangement for determining the value $V_0$ of a dependent function which varies in a linear or curvilinear manner with an independent variable $t$ when the value of the dependent function is known in at least two points.

A further object of this invention is to provide an improved signal processing method and arrangement.

A further object of this invention is to provide an improved method and arrangement for extrapolating from known points on a curve to other unknown points on the curve.

Briefly, in accordance with one embodiment of this invention, an arrangement is provided for determining the value $V_0$ of a dependent function which varies in a linear or curvilinear manner with an independent function $t$ when the value of the dependent function is known in at least two points ($V_1$ and $T_1$ and $V_2$ and $T_2$), which comprises storing the values $V_1$ and $V_2$, obtaining the algebraic difference between $V_2$ and $V_1$ to obtain a difference, adding this difference to $V_1$ to obtain $V_0$. The point $T_1$ is selected to be a desired operating point and $T_2$ is selected to be twice $T_1$ plus an increment $\pm \Delta T$ having a departure from zero depending upon the degree of departure of the curve from a straight line.

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawings in which FIG. 1 illustrates graphically certain principles underlying the present invention.

Figure 2:
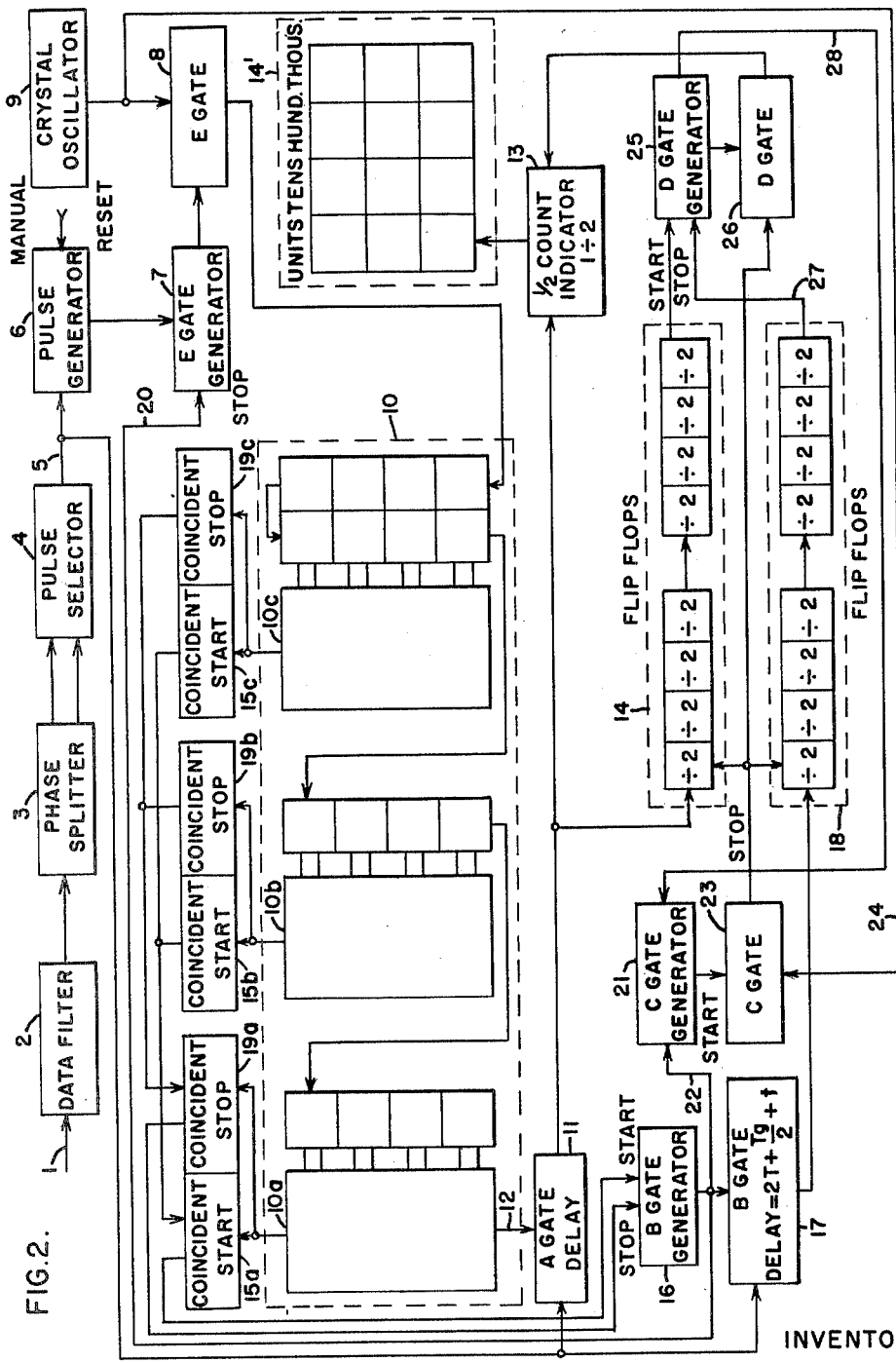

FIG. 2 illustrates in block diagram one application of the present invention to measuring muzzle velocity.

Figure 1B:
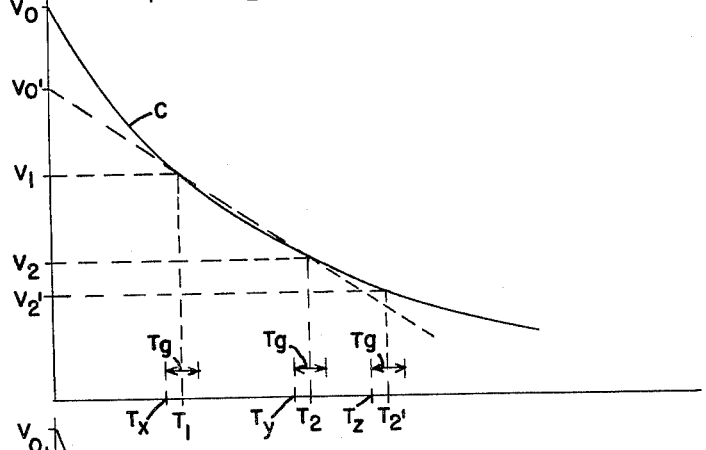

Referring now to the drawings and in particular FIG. 1 thereof, FIG. 1a illustrates graphically a linear function and FIG. 1b a curvilinear function. In FIG. 1a a function $V$ is plotted as ordinate and an indepedent variable or a parameter $t$ is plotted as abscissa. If the values $V_1$ and $V_2$ are known at the points $T_1$ and $T_2$, it is possible to extrapolate along the curve C and determine the initial condition $V_0$. In accordance with one embodiment of this invention, if the point $T_2$ is selected to be $2T_1$, then by well-known trigonometric principles the distance $ab$ equals the distance $bc$. $bc$ is actually equal to $V_1-V_2$. Thus by performing the subtraction operation $V_1-V_2$ and adding this difference to $V_1$, the initial condition $V_0$ is obtained.

Figure 1C:
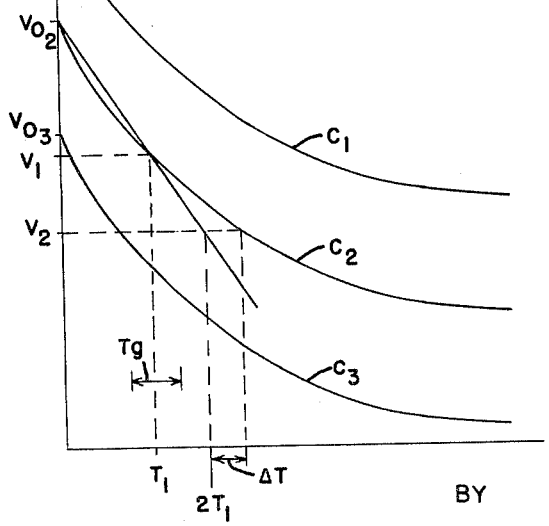

Difficulties are encountered when this procedure is applied in the case of a curvilinear function as shown in 1b. An inspection of this curve, wherein a function $V$ is plotted as ordinate and a parameter $t$ plotted as abscissa, illustrates that the procedure utilized in connection with explaining 1a would result in an erroneous calculation of the initial value $V_0'$ which is different from the actual value $V_0$ depending upon the curvature of the curve C. To compensate for the non-linearity in accordance with the principles of the invention, we measure the values of $V$ at points $T_1$ and $T_2'$, where $T_2'$ is greater than $T_2$ to an extent necessary to provide the correct value $V_0$. In a similar manner the computation $V_1+(V_1-V_2')$ is made to obtain the value of $V$ at $T=0$. The question arises how much greater should $T_2'$ be than $T_2$, or that is, how great should the interval $\Delta T$ between $T_2'$ and $T_2$ be. Assuming that the shape of the curvilinear function C is known, FIG. 1c illustrates the manner in which the desired $\Delta T$ is selected. In FIG. 1c, there is shown a series of three curves of the same shape, but having a different displacement from the T axis so that each of these three curves have a different initial value associated therewith as shown by $V_{01}$, $V_{02}$, $V_{03}$. If the principles employed in solving the problem exhibited by FIG. 1a were employed, the following approach would be employed. In this case, drawing a straight line through a value $V_1$ occurring at time $T_1$ and passing through an initial point $V_{02}$ would require at a time $2T_1$ a value $V_2$. This value $V_2$ of course is off the actual curve $C_2$. However, if $\Delta T$ is now selected such that the total time $2T_1+\Delta T$ corresponds to a value $V_3$ on the curve $C_2$, then the correct value of initial value $V_{02}$ may be obtained by the simple trigonometric principle outlined in FIG. 1a. In practice, this is how $\Delta T$ may be quickly determined.

Referring to FIG. 2 of the drawings, there is shown an embodiment for computing the velocity at time $T=0$ for the characteristic, say C of FIG. 1b. It is necessary to obtain velocity readings at two points on the curve. Referring to FIG. 1b, if $T_2=2T_1$, $V_0'=V_1+(V_1-V_2)$. The velocities $V_1$ and $V_2$ are selected to be the average of the velocity measurements taken during a given measuring period $T_g$. Referring to FIG. 1b it is seen that the delay time for commencing the measuring period for $V_2$ must be $$2T_x + \frac{Tg}{2}$$

in order to make $T_2=2T_1$. In accordance with an embodiment to be explained in detail, the delay time for starting the two velocity measuring periods is determined by the position of manual selector switches. The computing action is as follows: The velocity $V_1$ is displayed or registered on a decade indicator. The algebraic difference between $V_1$ and $V_2$ is stored. Finally, $(V_1-V_2)$ is added to $V_1$ giving $V_0$, and this total count is indicated on the decade indicator. As previously mentioned, due to the change of slope of the curve, it is necessary to delay the time $T_y$ beyond $$2T_x + \frac{Tg}{2}$$

to $T_z$. In knowing the approximate curvature of C, the value $T_z$ is selected by the manual selector switches.

In explaining FIG. 2, it should be noted that signals appear on lead 1 having a frequency corresponding to the velocity which varies with time as shown by curve C of FIG. 1b. In order to decrease the possible error due to operation of certain signal gates to be described, the frequency has been doubled for processing in these gating circuits. Then in order to read the velocity directly in feet per second, the data from the gating circuits is sent to decade counters via a divide-by-two stage which also contains a half-count indicator. This method reduces the possible gate ambiguity error from $\pm 1$ count to $\pm\frac{1}{2}$ count per gate.

The doppler or frequency signal from the data filter 2 is a differentiated square wave consisting of positive and negative pulses. The phase splitter 3 is a pentode with both a plate and cathode load. The doppler output signals from the plate and cathode are 180° out of phase. The pulse selector 4 is a dual triode with a common cathode load. Both sections are operated at cut-off bias and each grid receives one of the two outputs from the phase splitter. Because the two triode sections are operating at cut-off, only positive pulses on the grid are passed through the tube and appear as positive pulses at the common cathode resistor connected to lead 5. This results in positive pulses at twice the doppler frequency at lead 5. For further detailed explanation of this type of circuitry, reference is made to the co-pending application of Edwin Shain, Serial No. 697,038 filed November 18, 1957, now Patent No. 2,987,674, and assigned to the same assignee.

The first doppler pulse available on lead 5 from the pulse selector 4 triggers the pulse generator 6 into generating an output signal. This, in turn, triggers the E gate generator 7 which opens the E gate 8. The opened E gate passes oscillations from crystal oscillator 9 to the count-down chain of flip-flops 10.

The A gate 11 will open only for a period $Tg$ after a delay T of a multiple from 1 to 5 times $Tg$ according to the position of one of the manually operated time delay switches associated with chain 10. This gate signal available on lead 12 passes the output of the pulse selector 4, which constitutes pulses at twice the doppler frequency rate, to the $\frac{1}{2}$-count indicator-divide-by-two stage 13 and to one of the memory chain of flip-flops 14. The $\frac{1}{2}$-count indicator 13 divides its input by two and drives the decades 14′ at the doppler frequency to register a count corresponding to a velocity, say $V_1$. The memory chain 14 stores a count equal to $2V_1 - n_1(2)^8$, where $V_1$ is the average velocity during the gating period of the A gate 11 and $n_1$ is the integer portion of the quotient $$\frac{2V_1}{(2)^8}$$

At a time delay of $$2T + \frac{Tg}{2} + t$$

the coincident start generators 15a, b, c will trigger the B gate generator 16 which opens the B gate 17, passing the output of pulse selector 4 to the second memory chain of flip-flops 18. After a period $Tg$, determined by the count-down chain of flip-flops 10, the coincident stop generators 19a, b, c trigger the B gate generator 16 which closes the B gate 17. The time $t$ is determined by the combined setting of the three delay selector switches 10a, b, c. Generators 15a, b, c and 19a, b, c comprise conventional "AND" circuits such as are described on page 24 of "Logical Design of Digital Computers," Montgomery Phister, Jr., John Wiley & Sons, 1958. In a particular embodiment, it was possible to vary $t$ from 0 to 70,042 microseconds in steps of approximately 183 microseconds. By using such a coincident type of timing circuit, accurate timing can be obtained with no calibration problem, as opposed to an analog type timing circuit.

The B gate 17 passes the signal from the pulse selector 4, which is double the doppler frequency, to the second memory chain of flip-flops 18, which store a count equal to $2V_2 - n_2(2)^8$ where $V_2$ equals the average velocity during the gating period of gate B, and $n_2$ equals the integer portion of the quotient $$\frac{2V_2}{(2)^8}$$

When the B gate 17 closes, a pulse is sent to the E gate generator 7 over lead 20, which closes the E gate 8 and thereby prevents the count-down chain 10 from re-cycling. Also, a start trigger is sent to the C gate generator 21 on lead 22 from B gate generator 16 when the B gate closes.

The C gate 23 passes oscillations available on lead 24 from the crystal oscillator 9 to both of the memory chains 14 and 18, driving them in unison. After some number of oscillations have been passed by the C gate 23, the D gate generator 25 is triggered by the output of 14 and opens the D gate 26. (The number of pulses required to do this is $N = (2)^8 - (2V_1 - n_1(2)^8)$. When the D gate 26 opens, the oscillations driving the memory chains from the C gate 23 are simultaneously sent through the D gate 26 to the $\frac{1}{2}$-count indicator-divide-by-two stage 13 and added to the original velocity count $V_1$ registered in 14′. After a number of oscillations corresponding to the difference in count storage between the two memory chains pass through the D gate 26, the last flip-flop of the second memory chain 18 triggers the D gate generator 25 with a stop pulse over lead 27 that closes the D gate 26. Note that the maximum count storage, $2V_1 - 2V_2$, must be less than $(2)^8$. If the count storage is greater than $(2)^8$, the second memory chain will send a stop pulse to the D gate generator 25 prematurely, and the number of oscillations passing through the D gate 26 will be less than $2V_1 - 2V_2$ by some multiple of $(2)^8$. (If it is found necessary to increase the amount of the maximum count storage, more flip-flops can be added to the memory chain.)

When the D gate 26 is closed by the output of D gate generator 25, a stop pulse is sent from the D gate generator 25 to the C gate generator 21 over lead 28, which closes the C gate. This completes the sequence of operation. To perform a new computation for extrapolating for $V_0$, the decade indicators and flip-flops are reset to their original condition.

Recapitulating a sequence of operation of the arrangement of FIG. 2, the first incoming pulse on lead 5 causes the E gate generator 7 to apply a pulse to E gate 8 enabling pulses from source 9 to be applied through gate 8 to the pulse counter or flip-flop stages 10. After a predetermined number of source 9 pulses have been counted by 10, an output pulse appears on lead 12 of duration $Tg$ (based on a selection of the repetition frequency of pulses from 9) and starting at a time $T_x$ (based on the frequency of source 9 pulses and the position of selector switches in 10). For this period $Tg$, a number of pulses from lead 5 are applied to 13 and 14. 14′ stores the number of applied pulses divided by two. 14 stores a number of pulses 5 equal to $2V_1 - n_1(2)^8$ as previously described. Sometime later at time $T_z$, 15a generates a trigger pulse which causes 16 to open and remain open for a period $Tg$ until a stop trigger pulse is received from 19a. During the open period of B gate, 18 stores a number of pulses from lead 5 equal to $2V_2 - n_2(2)^8$ as previously described. B gates closing, opens the C gate. C gate passes pulses from 9 driving 14 and 18 in unison. The output from 14 starts the D gate generator which opens D gate 26 and passes the pulses from 9 also to 13 and 14′ through 26. The pulses from 9, thereafter passed by 26 to 14′ until 18 delivers an output to 25, constitute the difference in counts stored in 14 and 18. The output from 25 on 28 then stops C gate generator from further passing pulses from 9 to the pulse counters 14 and 18.

The result is that a desired computation has been performed and the result indicated.

While FIG. 2 illustrates an arrangement for storing electrical values of $V_1$ and $V_2$ (see FIG. 1), subtracting such stored values, and adding the difference to $V_0$, other arrangements can be employed. For example, the step of storing can be carried out with magnetic cores, pulse amplifiers, analog storage circuits, etc.—the function of subtracting and adding can be carried out with resistance networks, logical core magnetic circuitry, tubes, relays, etc. Also, the steps of generating signals representative of these results may be carried out by the pulse counters and gating circuits shown in FIG. 2, as well as by mechanical shaft positions of analog circuits, such as potentiometers, etc., performing these same functions. Furthermore, these steps can be carried out manually by drawing construction lines upon the various forms of FIG. 1.

While a specific embodiment has been shown and described, it will of course be understood that various modifications may yet be devised by those skilled in the art which will embody the principles of the invention and found in the true spirit and scope thereof.

What I claim and desire to secure by Letters Patent of the United States is:

1. In combination, a source of first pulses of variable recurrence rate, a source of second counting pulses of fixed recurrence rate, a first pulse counter responsive to said second pulses for producing a first output pulse after a predetermined number of said second pulses have been counted and a second output pulse time delayed with respect to said first output pulse, means responsive to a first one of said first pulses of variable occurrence rate for applying said second counting pulses to said first pulse counter as input pulses, means responsive to said first output pulse from said first pulse counter to generate an A gate pulse of predetermined duration, second and third pulse counters, means responsive to the duration of said A gate pulse for applying said first pulses to said second pulse counter to store a corresponding count, means responsive to said second output pulse for generating a B gate pulse of predetermined duration, means responsive to the duration of said B gate pulse for applying said first pulses to said third pulse counter to store a corresponding count, means responsive to the termination of the B gate pulse for simultaneously applying said second pulses to said second and third pulse counters, a count indicator, means responsive to an output pulse from said second pulse counter for applying said second pulses to said count indicator, means responsive to an output pulse from said third pulse counter to halt the application of said second pulses to said count indicator, and means responsive to the output of said third pulse counter for halting the application of said second pulses to said second and third counters.

2. In combination, a source of first pulses, a source of second pulses, means for producing a first trigger pulse, means for producing a second trigger pulse which is time delayed with respect to said first trigger pulse, means responsive to said first trigger pulse to generate an A gate pulse of predetermined duration, a first pulse counter and a second pulse counter, means responsive to the duration of said A gate pulse for applying said first pulses to said first pulse counter to store a train of said first pulses of a length determined by said predetermined duration, means responsive to said second trigger pulse for generating a B gate pulse of predetermined duration, means responsive to the duration of said B gate pulse for applying said first pulses to said second pulse counter to store a train of said first pulses of a length determined by said predetermined duration, means responsive to the termination of the B gate pulse for simultaneously applying said second pulses to said first and second pulse counters, an output circuit including a count indicator, means responsive to an output pulse from said first pulse counter for applying said second pulses to said output circuit, means responsive to an output pulse from said second pulse counter to halt the application of said second pulses to said output circuit, and means responsive to the output of said second pulse counter for halting the application of second pulses to said first and second counters.

3. In combination, a source of first pulses, a source of second pulses, means for producing a first trigger pulse, means for producing a second trigger pulse which is time delayed with respect to said first trigger pulse, means responsive to said first trigger pulse to generate an A gate pulse of predetermined duration, a first pulse counter and a second pulse counter, means responsive during the duration of said A gate pulse for applying said first pulses to said first pulse counter to store a corresponding count, means responsive to said second trigger pulse for generating a B gate pulse of predetermined duration, means responsive during the duration of said B gate pulse for applying said first pulses to said second pulse counter to store a corresponding count, means responsive at the termination of the B gate pulse for applying said second pulses to said first and second pulse counters, an output circuit including a count indicator, means responsive to an output pulse from said first pulse counter for applying said second pulses to said output circuit, and means responsive to an output pulse from said second pulse counter to halt the application of said second pulses to said output circuit.

4. In combination, a source of first pulses of variable recurrence rate, a source of second counting pulses of fixed recurrence rate, a first pulse counter responsive to said second pulses for producing a first output pulse after a predetermined number of said second pulses have been counted and a second output pulse which is time delayed with respect to said first output pulse, means responsive to a first one of said first pulses for applying said second pulses to said first pulse counter as input pulses, means responsive to said first output pulse from said first pulse counter to generate an A gate pulse of predetermined duration occuring at a predetermined time after the occurrence of said first one of said first pulses, second and third pulse counters, means responsive to the duration of said A gate pulse for applying said first pulses to said second pulse counter to store a count equal to $2V_1 - n_1(2)^8$ where $V_1$ is the average recurrence rate of said first pulses for said A gate duration and $n_1$ is the integer portion of the quotient $$\frac{2V_1}{(2)^8}$$

means responsive to said second output pulse for generating a B gate pulse of predetermined duration, means responsive to the duration of said B gate pulse for applying said first pulses to said second pulse counter to store a count equal to $2V_2 - n_2(2)^8$ where $V_2$ equals the average recurrence rate of said first pulses for said A gate duration and $n_2$ is the integer portion of the quotient $$\frac{2V_2}{(2)^8}$$

means responsive at the termination of the B gate pulse for simultaneously applying said second pulses to said second and third pulse counters, a count indicator, means responsive to an output pulse from said second pulse counter for applying second pulses to said count indicator, and means responsive to an output pulse from said third pulse counter to halt the application of said second pulses to said count indicator.

References Cited in the file of this patent
UNITED STATES PATENTS

| | | |
|---|---|---|
| 2,761,129 | Hills | Aug. 28, 1956 |
| 2,841,645 | Stateman | July 1, 1958 |
| 2,928,604 | Dudman et al. | Mar. 15, 1960 |
| 2,963,222 | Allen | Dec. 6, 1960 |
| 3,120,606 | Eckert et al. | Feb. 4, 1964 |